US011841238B2

(12) United States Patent
Cervelli et al.

(10) Patent No.: US 11,841,238 B2
(45) Date of Patent: *Dec. 12, 2023

(54) GEOTAGGING STRUCTURED DATA

(71) Applicant: Palantir Technologies Inc., Denver, CO (US)

(72) Inventors: Daniel P. Cervelli, Mountain View, CA (US); John Antonio Carrino, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/345,983

(22) Filed: Jun. 11, 2021

(65) Prior Publication Data

US 2021/0372811 A1 Dec. 2, 2021

Related U.S. Application Data

(63) Continuation of application No. 16/387,412, filed on Apr. 17, 2019, now Pat. No. 11,035,690, which is a continuation of application No. 14/818,102, filed on Aug. 4, 2015, now abandoned, which is a continuation of application No. 12/840,673, filed on Jul. 21, 2010, now Pat. No. 9,104,695.

(60) Provisional application No. 61/228,935, filed on Jul. 27, 2009.

(51) Int. Cl.
*G01C 21/36* (2006.01)
*G06F 16/29* (2019.01)
*G06F 16/50* (2019.01)

(52) U.S. Cl.
CPC ......... *G01C 21/3664* (2013.01); *G06F 16/29* (2019.01); *G06F 16/50* (2019.01)

(58) Field of Classification Search
None
See application file for complete search history.

(56) References Cited

U.S. PATENT DOCUMENTS 7,007,228 B1 * 2/2006 Carro ................. G06F 16/9537
707/E17.11
2002/0055924 A1 5/2002 Liming
2007/0260628 A1 * 11/2007 Fuchs .................... G06F 16/29
(Continued)

OTHER PUBLICATIONS

Elias, Birgit. "Extracting landmarks with data mining methods." International conference on spatial information theory. Berlin, Heidelberg: Springer Berlin Heidelberg, 2003. 15 pages. (Year: 2003).*

*Primary Examiner* — Uyen T Le
(74) *Attorney, Agent, or Firm* — Duane Morris LLP

(57) ABSTRACT

A mapping system comprising processes for creating and displaying structured geotagged data using interactive digital geographic imagery is disclosed. In one embodiment, a mapping system comprises processes and logic for creating a geo tag for structured data. A user creates a geo tag for a property of an object by selecting a geographic location on an interactive digital map and selecting the property of the object from a dialog presented to the user in response to selecting the geographic location. In this way, the user can more quickly and easily create structured geotagged data than can be accomplished using typical approaches requiring the user to manually enter geographic coordinates to associate a geographic location with structured data.

20 Claims, 12 Drawing Sheets

(56) References Cited

U.S. PATENT DOCUMENTS

2008/0033935 A1\* 2/2008 Frank .................... G09B 29/00
  707/999.005
2009/0228451 A1\* 9/2009 Ko ......................... H04L 67/52
2010/0185984 A1 7/2010 Wright
2019/0242719 A1 8/2019 Cervelli \* cited by examiner

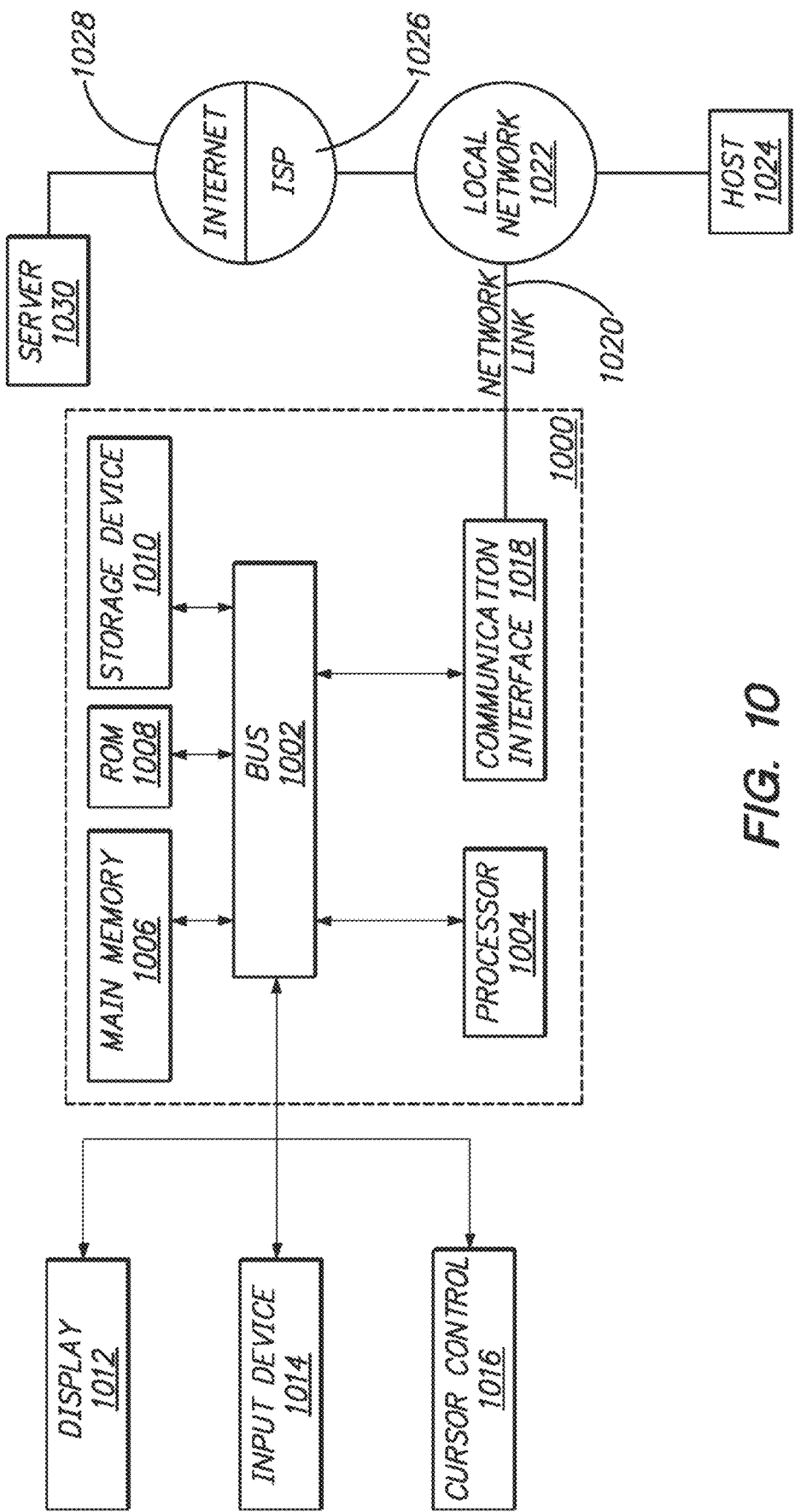

GEOTAGGING STRUCTURED DATA

BENEFIT CLAIM

This application claims the benefit under 35 U.S.C. § 120 as a Continuation of application Ser. No. 16/387,412, filed Apr. 17, 2019, which claims the benefit under 35 U.S.C. § 120 as a Continuation of application Ser. No. 14/818,102, filed Aug. 4, 2015, which claims the benefit under 35 U.S.C. § 120 as a Continuation of application Ser. No. 12/840,673, filed Jul. 21, 2010, which claims the benefit under 35 U.S.C § 119(e) of provisional application 61/228,935, filed Jul. 27, 2009, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright© 2009-2010 Palantir Technologies, Inc.

TECHNICAL FIELD

The invention is related to creating and displaying data with the use of digital maps, and more particularly to computer processes and logic for creating and displaying structured geotagged data with the use of interactive digital geographic imagery.

BACKGROUND

Mapping computer systems ("mapping systems") display digital geographic imagery of the Earth at varying perspectives including providing users an oblique view (e.g. bird's eye-view) of objects on the surface of the Earth such as houses, buildings, roads, lakes, mountains, and the like. Such geographic imagery may comprise satellite imagery, aerial photography, and the like. Since the Earth is a curved generally spherical object, the geographic images are rectified by the mapping systems so that the mapping systems can project the images onto a two-dimensional (2-D) plane such as a computer display screen. Mapping systems may use a coordinate system to identify a point on the surface of the Earth. One common coordinate system is geographic coordinates (latitude/longitude) on the World Geodetic System of 1984 (WGS84) datum. Latitude is an angular measurement in degrees ranging from 0 degrees at the Earth's equator to 90 degrees at the poles. Longitude is also an angular measurement but measured East or West instead of North or South. For example, the location of White House in Washington D.C. on the surface of the Earth as identified by a geographic coordinate is 38.898748 degrees latitude and −77.037684 degrees longitude.

It is often desirable to associate a geographic location with a piece of data and then display the data as a superimposition on digital geographic imagery. For example, it may be desirable to associate a geographic location with a street address such that when a map image of the street is displayed the address can be visually indicated by superimposing the text of the address, a symbol or other indicator on the map at the geographic location. The process of associating a geographic location with a piece of data, typically in the form of geographic coordinates (e.g., latitude/longitude), is known as geotagging. One approach for geotagging typically involves a user identifying the geographic coordinates of a particular location using a mapping system and then manually entering the coordinates into a database containing the one piece of data that is to be geotagged. However, this manual approach is awkward and inconvenient for the user and is a serious drawback for organizations that require geotagging of many thousands or many millions of pieces of data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings:

FIG. 10 illustrates a computer system with which an embodiment may be implemented.

DETAILED DESCRIPTION

Figure 1A:
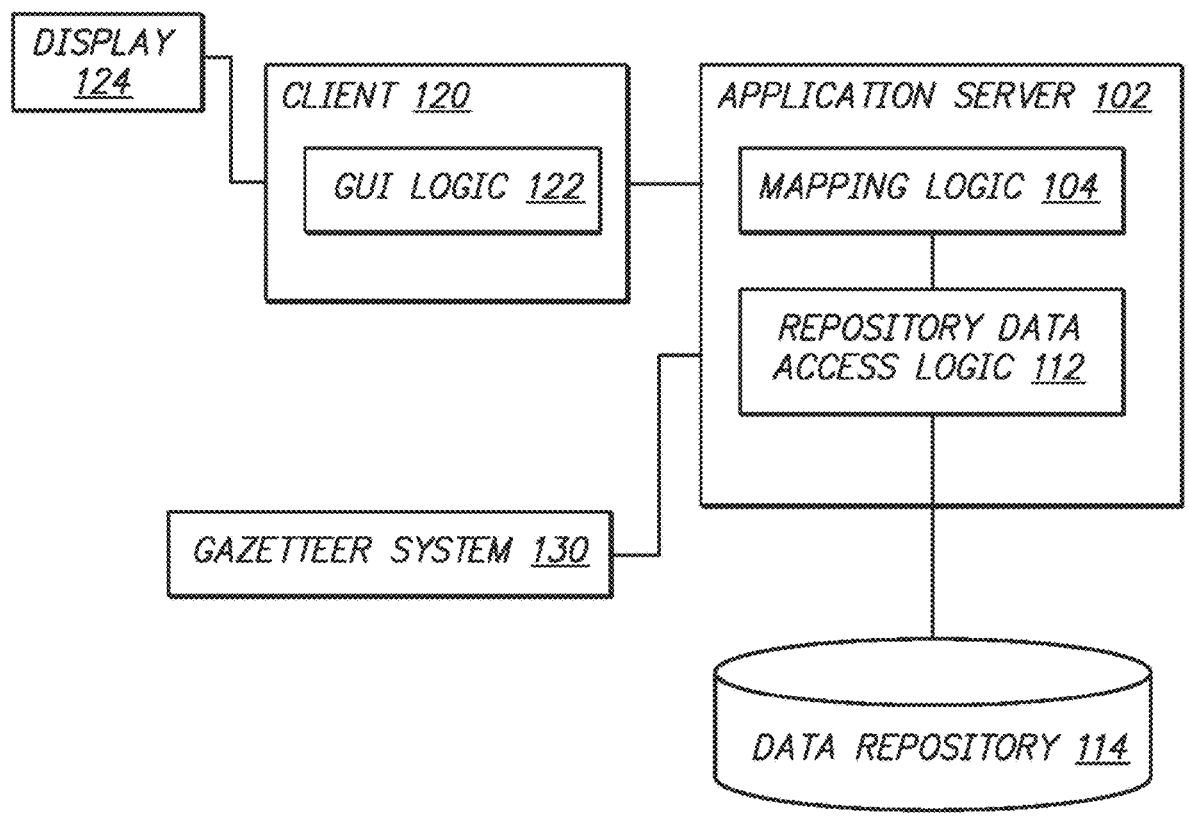
FIG. 1A illustrates an example mapping system.

Computer mapping processes for creating and displaying structured geotagged data using interactive digital geographic imagery are disclosed. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

The present disclosure is directed to processes and logic for creating and displaying structured geotagged data using interactive digital geographic imagery ("digital maps").

In one embodiment, a mapping system comprises processes and logic for creating a geo tag for existing structured data. According to one embodiment, a user creates a geo tag for a property of an existing object by selecting a geographic location on an interactive digital map and selecting the property of the existing object from a dialog presented to the user in response to selecting the geographic location. A property value is input. The object and a property may be selected from among objects and properties that have been defined in an extensible object ontology that is coupled to the processes or logic. Multiple objects may be associated with the same geographic location. Multiple instances of the same object having different property values may be associated with the same geographic location. In this way, the user can more quickly and easily create structured geotagged data than can be accomplished using typical approaches requiring the user to manually enter geographic coordinates to associate a geographic location with structured data.

In another embodiment, the mapping system comprises processes and logic for creating a geo tag for new structured data. According to an embodiment, a user creates a geo tag for a property of a new object by selecting a geographic location on an interactive digital map and entering a label name for the new object in a dialog presented to the user in response to selecting the geographic location. In this way, the mapping system allows a user to simultaneously create a geo tag and the structured data to which the tag will be associated. Further, the geo tag and the structured data can be created through a single graphical user interface dialog.

In another embodiment, the mapping system comprises processes and logic for sourcing a geo tag. According to one embodiment, the mapping system allows the user to associate a geo tag with a source of information about the geo tag such as a document, media file, hyperlink, and the like. Multiple sources may be associated with the same geographic location.

In another embodiment, the mapping system comprises processes and logic for creating a geo tag for structured data from a geographic location that is determined by submitting a query string to a gazetteer system. According to one embodiment, the mapping system allows the user to enter a query string related to a geographic location which the mapping system in turn submits to a gazetteer system. The gazetteer system returns geographic coordinates corresponding to the entered query string and the mapping system presents to the user an interactive digital map image of the Earth that corresponds to the returned geographic coordinates. The user can then geo tag structured data by selecting a geographic location on the interactive digital map and either selecting a property of an existing object from a dialog presented to the user in response to selecting the geographic location or entering a label name for the new object in a dialog.

In another embodiment, the mapping system comprises a process and logic for concurrent display of structured geotagged data superimposed on a digital map image and a histogram displaying properties of the structured geotagged data as a function of time.

In another embodiment, the mapping system comprises a process and logic for concurrent display of filtered structured geotagged data superimposed on a digital map image and a histogram displaying properties of the filtered structured geotagged data as a function of time.

In another embodiment, the mapping system comprises processes and logic for concurrent display of structured geotagged data superimposed on a digital map image. The displayed structured geotagged data fall into one or more user-selected time windows selected by interacting with a concurrently displayed histogram.

In another embodiment, the mapping system comprises processes and logic for dynamic and updated display of structured geotagged data superimposed on a digital map image. The displayed structured geotagged data fall into a user selected time window on a concurrently displayed histogram. The display of the geotagged data superimposed on the image is dynamically updated as the user adjusts the selected time window.

Example Mapping System

FIG. 1A illustrates an example mapping system comprising processes for creating and displaying structured geotagged data using interactive digital geographic imagery. Mapping system 100 comprises application server 102 and one or more clients, such as client 120. The client 120 of FIG. 1 broadly represents any host computer of an intelligence analyst, database administrator, or other user who interacts with data repository 114 through mapping logic 104. Users can access mapping logic 104 through GUI logic 122 to obtain information from data repository 114 and to obtain services of mapping logic 104. Client 120 may comprise a personal computer, workstation, or other data processing system.

In the embodiment illustrated in FIG. 1A, client 120, which may be implemented by one or more first physical computing devices, is communicatively connected to application server 102, which may be implemented by one or more second physical computing devices, over one or more networks, network links, or inter-networks. In some embodiments, each such physical computing device may be implemented as a separate computer system as show in FIG. 10. For example, client 120 may be implemented in a computer system as a set of program instructions recorded on a machine-readable storage medium, while application server 102 may be implemented in a different computer system.

Client 120 comprises graphical user interface (GUI) logic 122, GUI logic 122 may be a set of program instructions which, when executed by one or more processors of the computer system, is operable to receive user input and display one or more graphic constructs related to creating and displaying structured geotagged data using the approaches herein. GUI logic 122 may be operable to receive user input from, and display the graphic constructs to, a graphical user interface that is provided on display 124 by the computer system on which client 120 executes.

Client 120 may also interact with application server 102 to provide input, definition, editing instructions, expressions related to one or more objects or constructs as described herein using a programmatic interface. Application server 102 may use, process, log, store, or otherwise interact with the received input according to application server logic.

Application server 102 may be implemented as a computer system having the logical elements show in FIG. 1. In an embodiment, the logical elements may comprise program instructions recorded on one or more computer-readable storage media. Alternatively, the logic elements may be implemented in hardware, firmware, or a combination of hardware and software.

When executed by one or more processors of the computer system, logic in application server 102 is operable to create and display or otherwise use structured geotagged data using digital maps according to the techniques described herein. In one embodiment, application server 102 may be implemented in a Java Virtual Machine (JVM) that is executing in a distributed or non-distributed computer system. In other embodiments, application server 102 may be implemented as a combination of programming instructions written in any programming language (e.g., C++ or Visual Basic) and hardware components (e.g., memory, CPU time) that have been allocated for executing the program instructions.

In an embodiment, application server 102 comprises repository access logic 112 and mapping logic 104. Repository data access logic 112 may comprise a set of program instructions which, when executed by one or more processors, are operable to access and retrieve data including digital map data, structured data, and structured geotagged data from data repository 114. For example, repository access logic 112 may be database client or a Java Database Connectivity (JBDC) client that supports calls to a database server that manages data repository 114. Data repository 114 may be any type of structured storage for storing data including, but not limited to, relational or object-oriented databases, data warehouses, directories, data files, and any other structured data storage.

In the embodiment illustrated in FIG. 1A, mapping logic 104 comprises logic to create, read, update, and delete digital map data, structured data, and structured geotagged data in response to input from client 120. Mapping logic 104 also comprises logic for processing input from client 120 and for providing data to be rendered by GUI logic 122 on display 124 in response to client input. In one embodiment, mapping logic 104 is object-oriented logic developed using an object-oriented programming language such as the Java programming language. Further, for purposes of illustrating a clear example, certain embodiments are described with mapping logic 104 receiving input from and providing output to client 120 under control of a user. Alternatively, mapping logic 104 may define an application programming interface (API) and may receive input in the form of calls or programmatic requests from other logic, systems or software elements and may provide output in the form of responses to the calls. Thus, all description herein of user interaction with mapping logic 104 broadly encompasses programmatic interaction with mapping logic without direct user involvement.

Application server 102 may be connected to a gazetteer system 130. Gazetteer system 130 is a computer system that functions as a geographical index. In one embodiment, gazetteer system 130 receives as input a search or query string and returns a list of geographic coordinates that correspond to the inputted query string. Gazetteer system 130 may maintain a database for associating text with geographical coordinates. Gazetteer system 130 may provide an online network accessible interface that can be accessed by another computer system such as application server 102 using known or standardized network protocols such as the HyperText Transfer Protocol (HTTP). Alternatively, gazetteer system 130 may be a component of application server 102.

Figure 1B:
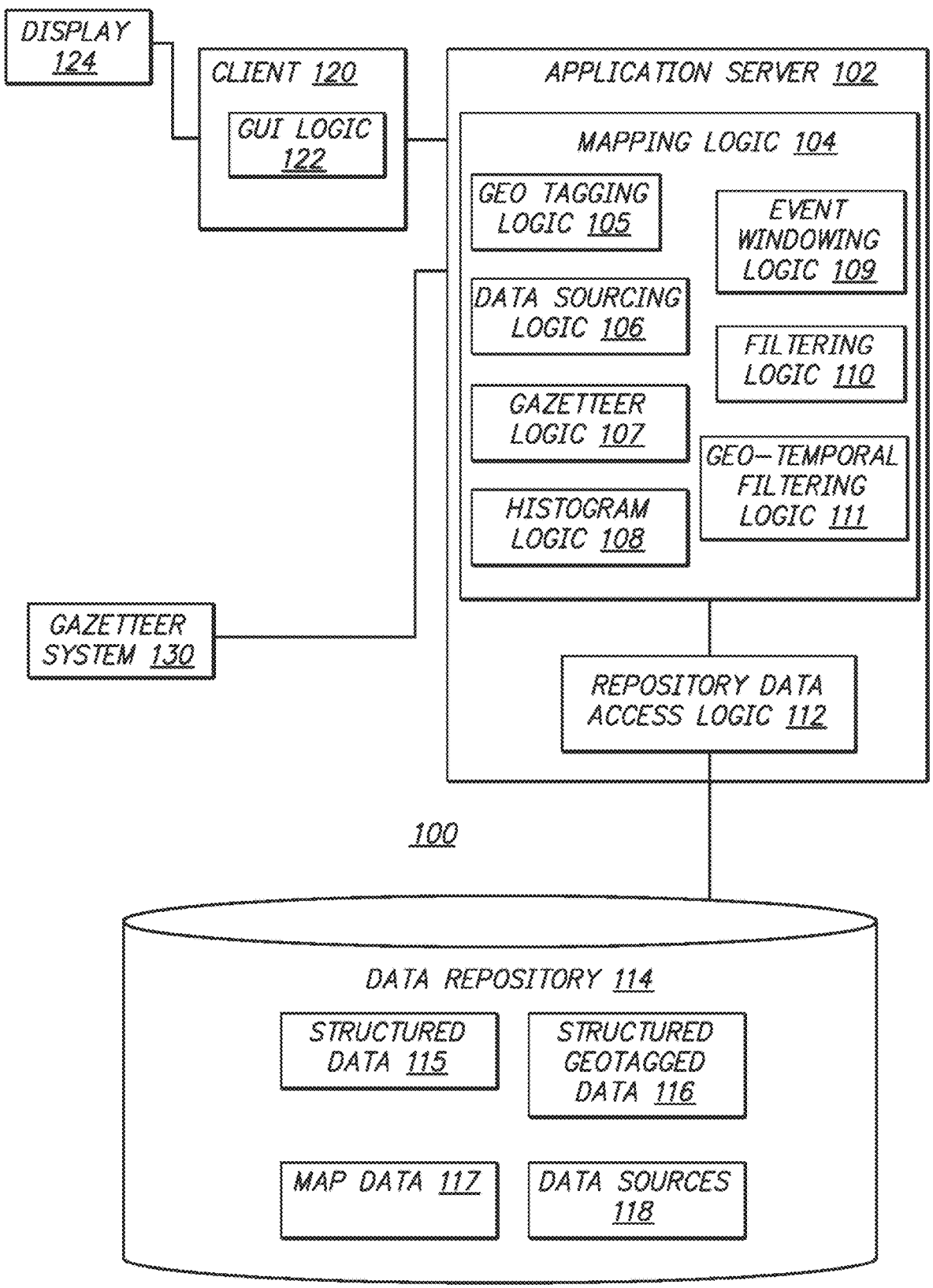
FIG. 1B illustrates an example mapping system in greater detail.

FIG. 1B illustrates the example mapping system of FIG. 1 in greater detail. As shown in FIG. 1B, mapping logic 104 comprises geo-tagging logic 105, data sourcing logic 106, gazetteer logic 107, histogram logic 108, event windowing logic 109, filtering logic 110, and geo-temporal filtering logic 111 each of which comprise logic for processing input from client 120 and for providing data to be rendered by GUI logic 122 on display 124 in response to client input.

In one embodiment, geo-tagging logic 105 implements the functions described herein for creating a geo-tag for structured data. Data sourcing logic 106 implements the functions described herein for associating data sources with structured geotagged data. Gazetteer logic 107 is configured to interact with gazetteer system 130 by submitting search queries to gazetteer system 130 and receiving in response a set of search results in the form of one or more geographic coordinates that correspond or match the given query. Gazetteer logic 107 may interoperate with geo-tagging logic 105 to implement the functions described herein for creating a geo-tag for structured data using a gazetteer system. Histogram logic 108 implements the functions described herein for concurrent display of structured geotagged data superimposed on a digital map image and a histogram displaying properties of the structured geotagged data as a function of time. Event windowing logic 109 implements the functions described herein for displaying filtered structured geotagged data according to user-selected time windows. Filtering logic 110 implements the functionality described herein for generating and displaying views of filtered structured geotagged data. Geo-temporal filtering logic 111 implements the functions described herein for generating geo-temporal displays of filtered structured geotagged data.

In an embodiment, logics 105-111 may be implemented in a single computer program or module or implemented in a fewer number of computer programs or modules than is shown in FIG. 1B. Further, portions of logic 105-111 may be implemented by computer systems other than application server 102 such as, for example, by GUI logic 122 of client 102. Thus, the structural separation of functional modules as shown in FIG. 1B is not required and the same functions described herein for such functional modules may be implemented structurally in any other convenient manner.

As shown in FIG. 1B, data repository 114 may comprise structured data 115, structured geotagged data 116, map data 117, and data sources 118. Structured data 115 and structured geotagged data 116 is described in greater detail below. Map data 117 refers data for rendering geographic images on the display 124 of client 120. Map data 117 may comprise a library of digital images comprising satellite and aerial images of the surface of the Earth. In addition, map data 117 comprises image metadata for mapping a given image coordinate from an image of the Earth to a corresponding geospatial coordinate. Data sources 118 refers broadly to any data that serves as a data source for structured data 115 or structured geotagged data 116. Non-limiting examples of data sources 118 include electronic documents, e-mails, electronic images or other media files, a reference or link such as a Uniform Resource Locator (URL) to a document available from another computer system, and the like.

Structured Data

Structured data is any data that adheres to a conceptual data model. In one embodiment, the mapping system works with structured data that adheres to a conceptual data model comprising objects and properties that are organized according to an object ontology. An object represents a real-world entity such as a person, place or thing. An object can also represent a real-world event such as a "phone call" or a "meeting". Each object may have one or more properties for describing various aspects of the object. For example, a "person" object may have an "address" property and a "phone number" property. Instances of objects may be labeled for identification. For example, an instance of a "person" object may be labeled with the person's name.

The structured data may be stored in a database managed by a computer-based database management system, such as a relational database management system (RDBMS), according to a fixed or dynamic structure of data containers (e.g., tables) and relationships. The database structure may be described using an ontology, embodied in a database schema, comprising a data model that is used to represent the structure and reason about objects and properties in the structure. In an embodiment, the ontology is provided as described in PCT international patent publication PCT/US2008/064207 A2.

In one embodiment, the mapping system works with objects and properties according to a user-specified ontology specified in terms of object types and property types. Non-limiting examples of object types include a "person" object type, a "location" object type, and an "event" object type. Non-limiting examples of property types include an "address" property type, a "phone number" property type, and a "location name" property type. Objects may have any number of properties. Objects stored as structured data in the database may be instantiated based on user-defined object types. Each property of an object stored as structured data may be instantiated based on user-defined property types. Further, object types and property types may be instantiated based on a base type. For example, a base type for a "home" object type may be a "location" object type. The object ontology may be dynamically extended during use of the mapping system described herein by entering new names of objects or new property names, causing the system to create entries for the objects or properties in the ontology.

Structured Geotagged Data

Structured geotagged data is structured data that is associated with a geo tag. A geo tag is geospatial metadata that represents a point on the surface of the Earth according to a geospatial coordinate. A geo tag may be stored in a database and associated with structured data according to a database data model such as, for example, a relational database model.

In one embodiment, a geo tag comprises an identifier of a location, and an optional date range, and may be associated with a property of an object. For example, a geo tag may be stored in a database and associated with an "address" property of a "person" object. In one embodiment, the location of a geo tag represents a point of the surface of the Earth and is stored as a latitude/longitude geospatial coordinate pair according to the World Geodetic System (WGS). However, embodiments are not limited to any particular type or format of geospatial coordinates or any particular geodetic system and a geospatial location of a geo tag may be represented using virtually any geographic coordinate system such as a the Universal Transverse Mercator (UTM) coordinate system or the Military Grid Reference System (MGRS).

The optional date range may be used to specify a time period during which the location identified by a geo tag is applicable to or valid for the property associated with the geo tag. Thus the optional date range is useful for capturing a temporal aspect of a geospatial attribute of a property of an object. For example, consider an object representing a face-to-face meeting between two persons, the object having a location property whose value is the postal address of the location of the meeting. In this example, a geo tag may be stored and associated with the "location" property of the "meeting" object. In addition, the geotag may specify a date range which indicates the duration of the meeting at the location indicated by the geo tag.

Creating a Geo Tag for Structured Data

Figure 2:
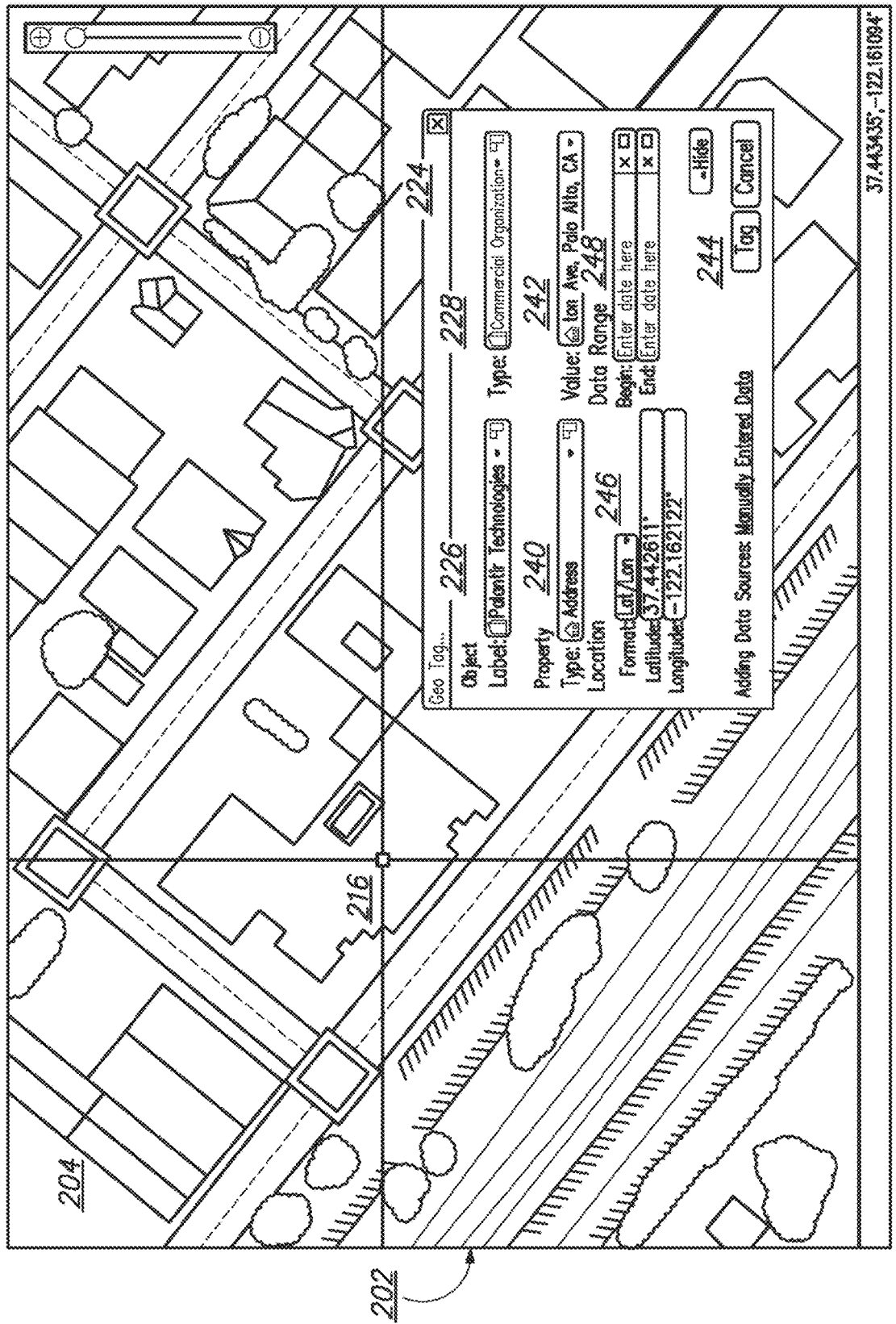
FIG. 2 is a screenshot of a graphical user interface for creating a geo tag for structured data.

FIG. 2 is a screenshot of a graphical user interface for creating a geo tag for structured data. The interface may be displayed to a user on the display of a computer system such as display 124 of client 120. The interface comprises map image window 202, map image 204, and geo tag dialog 224.

Map image 204 is a digital photograph of a particular area of the surface of the Earth at a particular altitude. The image may be captured by a satellite or aerial photography and imported into a mapping system such as mapping system 100. The interface may allow the user to select a particular map data source or map tile source from among a plurality of different map data sources all of which provide different sets of data that map the Earth or parts of the Earth. The interface may provide other interface tools (not shown) that allow a user to locate a map image for a particular surface area of the Earth at a particular altitude. For example, the initial map image presented to the user may be of the entire North American continent. The user may then use a pointing device such as a mouse or other input mechanism such as keyboard to zoom toward a particular surface region. For example, the user may zoom from an image of the North American continent to an image of the Western United States and then to an image of Northern California, to an image of Palo Alto, Calif., and finally to an image of the 100 block of Hamilton Avenue in Palo Alto, Calif.

Once the user has located the desired map image, the user may wish to associate a particular geographic location depicted by the image with an existing property of an existing object stored as structured data in a database. In one embodiment, to geo tag a property of an object, the user uses a pointing device such as mouse or other suitable input device to identify and select a geographic location on map image 204. For example, the user may direct, using an input device, a graphical pointer to a particular point on map image 204 and then select the point by clicking a mouse button. Alternatively, the user may select the geographic location by depressing a geo tag hot key while the graphical pointer is hovering over the desired geographic location on map image 204. In one embodiment, the hot key is the lowercase 't' key on a standard QWERTY keyboard. As shown in FIG. 2, the particular geographic point selected is within the area of crosshairs 216 overlaid on map image 204. The crosshairs 216 represent merely one example of how the system may indicate the selected location to a user. The area within the crosshairs 216 is arbitrary and may have any size or shape. Other forms of indication may be used such as various polygons, icons, pointers, or other user interface widgets.

In response to selecting a geographic location, geo tag dialog 224 is displayed. Dialog 224 may be used to select an object and a property of an object to associate with the selected geographic location. To select the desired object, dialog 224 provides object label control 226 and object type control 228, property type control 240, and property value control 242. Controls 226 and 228 may be used to select an existing object stored as structured data in a database based on an existing ontology, or to create a new object to be stored as structured data in the database and in the ontology.

Figure 3:
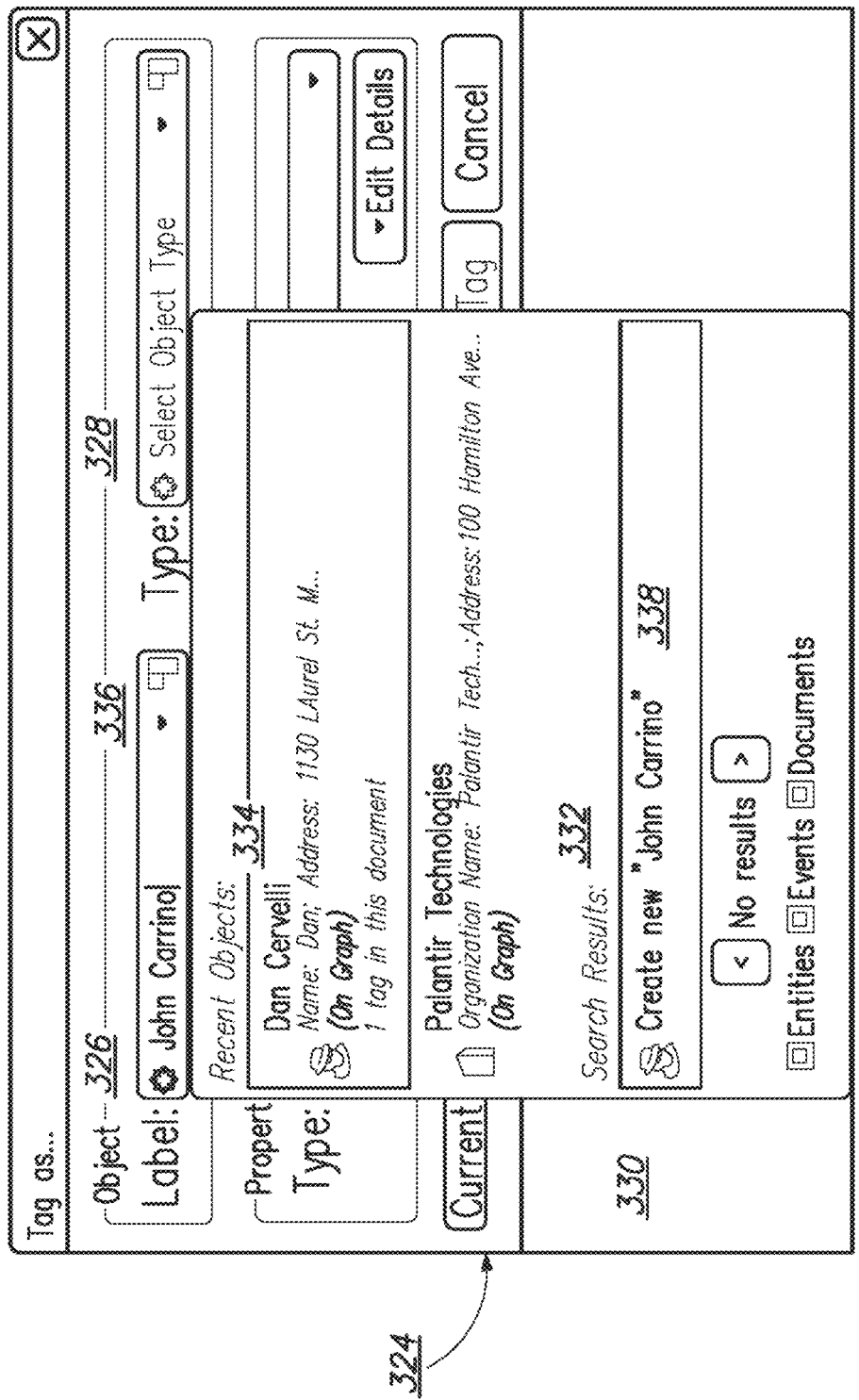
FIG. 3 is a screenshot of a graphical user interface for creating a geo tag for structured data.

Object label control 226 allows the user to search for an existing object based on a text label. Text inputted by the user into control 226 may be used by the mapping system to query objects within structured data that have labels that match or contain the inputted text. The results of the query on the structured data may be presented to the user on the interface allowing the user to select one of the results as the desired object. For example, FIG. 3 shows drop-down results panel 330 showing search results 332 resulting from a query against structured data for objects having a label matching the inputted text "John Carrino". In the example depicted by FIG. 3, no such objects were found as indicated by the "No Results" message at the bottom of panel 330. Panel 330 also contains a list of recently used objects 334 that may be selected by the user as the desired object. In one embodiment, panel 330 is presented to the user automatically as search results are available. In another embodiment, panel 330 is presented on-demand in response to user input such as, for example, in response to the user selecting the drop-down icon 336 in object label control 326.

In one embodiment, the mapping system is configured to perform an incremental search as the user inputs text in object label control 226. As the user types text into object label control 226, possible matches are presented to the user, for example, on panel 330 of FIG. 3. The immediate feedback of search results allows the user to select a desired object without having to type or input the entire label name into control 226.

In one embodiment, if no object matching the inputted label text is found, the user may create a new object with a label name equaling the inputted text. For example, control 338 on panel 330 of FIG. 3 allows the user to create a new object with the label name "John Carrino".

Returning to FIG. 2, object type control 228 indicates the current type, if any, of the object selected in object label control 226. Object type control 228 also allows the user to specify a new type for the object selected in object label control 226. In an embodiment, the types available for selection in object type control 228 are from an ontology such as the ontology described in PCT international patent publication PCT/US2008/064207 A2.

Once an object is selected or a new object is created, the user may select a property of the current object to be associated with the selected geographic location 216. To select a property of the current object the user may search for the property by value using property value control 242. As with object label control 226, the mapping system may employ an incremental search as text is entered into control 242. If the desired property value is currently not a property of the current object, then the user may create a new property of the current object by entering a new value in property value control 242. Property type control 240 may be used to select the property type of a new property value entered into control 242 or to select a new property type for an existing property value found using the search feature of control 242.

Dialog 224 also comprises location information 246 and date range information 248. Location information 246 and date range 248 comprise the geospatial data of a geo tag that is to be associated with the selected object property.

In the embodiment depicted by FIG. 2, location information 246 indicates the geospatial coordinates of the selected geographic location 216 in terms of latitude and longitude. However, location information 246 may indicate geospatial coordinates using other geospatial coordinate systems such as the Universal Transverse Mercator (UTM) coordinate system or the Military Grid Reference System (MGRS). The user may use the drop-down select box labeled "Format:" to select the desired geospatial coordinate system used to represent the geospatial location of location 216. When presenting dialog 224 to the user, mapping system automatically determines the geographic coordinate (e.g., latitude and longitude) of the selected location 216. Thus, the user does not need to enter the geospatial coordinates (e.g., latitude and longitude) of a desired geographic location in order to identify that location to the mapping system. Instead, the user may simply select or click on the desired location on the map image 204 to identify geographic location 216. Alternatively, the user may use the hot key approach for identifying a location on a map image as described previously. To automatically determine a geospatial coordinate from a user selected location on a map image, the mapping system may employ logic, such as mapping logic 104, for translating an image coordinate to a geospatial coordinate.

Date range information 248 may be specified by the user to indicate a timeframe during which the specified location 216 is applicable to the selected object property. For example, a date range could be applied to a geo tag of an "address" property of a "person" object to indicate that the person had the address of the specified location during the specified timeframe. As another example, a date range could be applied to a geo tag of an "address" of a "meeting event" object to indicate that that a meeting took place at the specified location for the specified timeframe.

Once an object and a property of the object have been selected, the user can geo tag the selected object property by clicking the "Tag" button 244 on dialog 224. Clicking button 244 causes the mapping system to store data in a database such as data repository 114 associating the indicated geospatial data 246 and 248 with the selected object property.

Sourcing Geo Tagged Properties

In an embodiment, the mapping system allows the user to source a geo tagged property. Sourcing refers to associating in a database structured data with one or more data sources. Data sources may include manually entered data, electronic documents, e-mails, electronic images or other media files, other computer systems, and the like.

Figure 4:
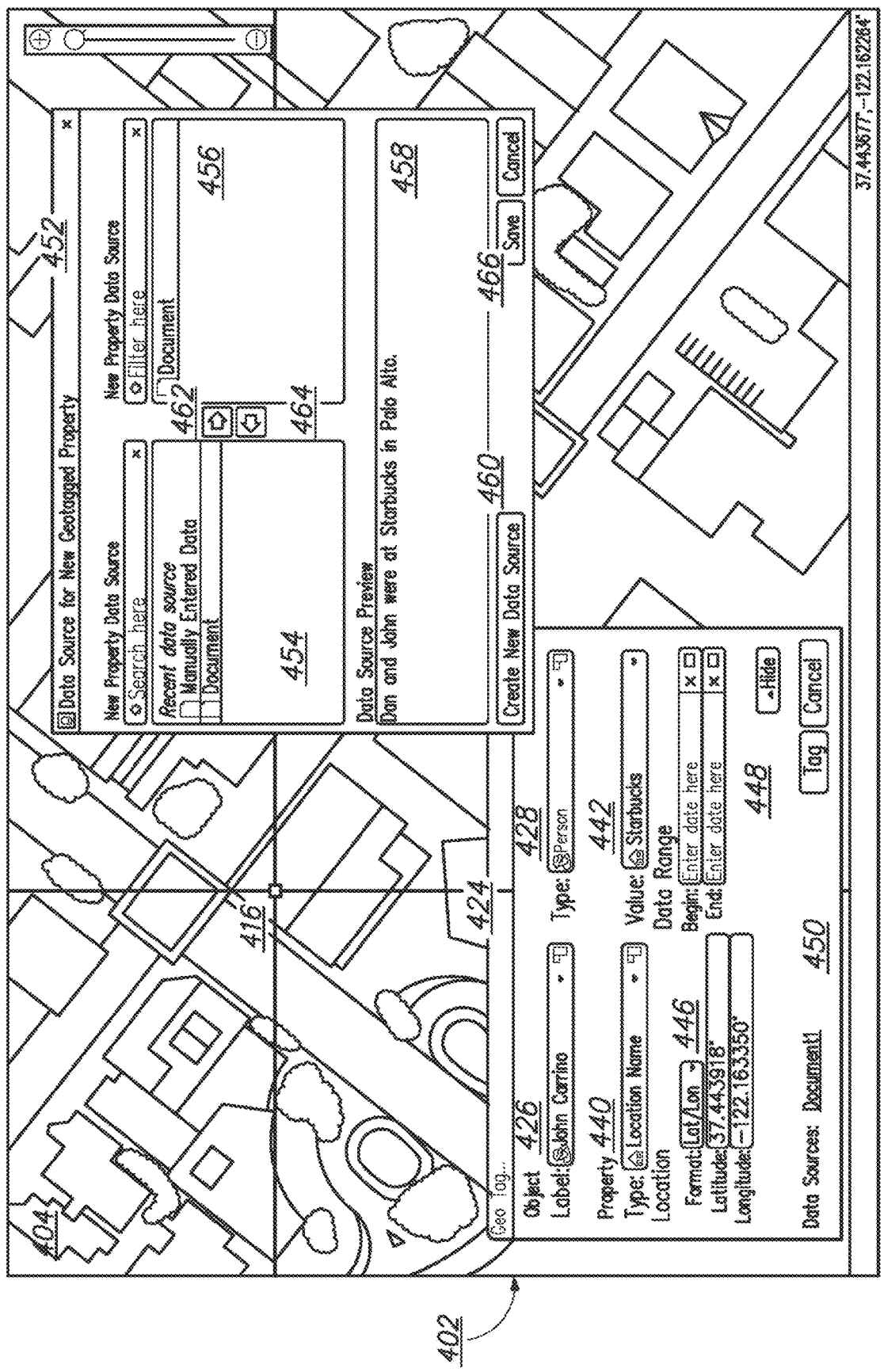
FIG. 4 is a screenshot of a graphical user interface for sourcing a geo tagged property.

FIG. 4 is a screenshot of a graphical user interface for sourcing a geo tagged property. The interface may be displayed to a user on the display of a computer system such as display 124 of client 120. The interface comprises map image window 402, map image 404, geo tag dialog 424, and data sources dialog 452.

In an embodiment, data sources dialog 452 is displayed in response to the user selecting an active data source link 450 on geo tag dialog 424. With data sources dialog 452, the user can associate one or more data sources with a new geotagged property. To associate one or more data source with a new geotagged property, data source dialog 452 provides available data sources panel 454 and selected data sources panel 456. With available data sources panel 454 the user may enter text to search for existing data sources. In one embodiment, a list of recently used data sources appears in available data sources panel 454.

Selected data sources panel 456 lists the data sources to be associated with the new geotagged property. The user can add data sources to the selected data sources list 456 by selecting one or more data sources listed in the available data sources panel 454 and then selecting arrow 462. The user can remove data sources from the selected data sources list 456 by selecting one more data sources listed in the selected data sources panel 456 and then selecting arrow 464. The user has the operation to create a new data source by selecting button 460 if the desired data source has not yet been entered into the mapping system.

Data source preview pane 458 provides the user with a preview of the currently selected data source in available data sources panel 454.

Once the user has selected the desired data sources to associate with the new geotagged property, the user selects the save button 466. Clicking button 466 causes the mapping system to store data in a database such as data repository 114 associating selected data sources 456 with the selected object property as indicated by controls 426, 428, 440, and 442 on dialog 424. The user may repeat the foregoing process any number of times for any number of data sources.

Associating data sources with a geo tagged property provides numerous benefits in comparison to prior approaches. For example, in a government application, a user could associate multiple intelligence reports about a particular individual with a location that the individual is known to reside, have a place of business, or have another form of association. In a genealogy application, a user could associate multiple images of historical documents with a present or historical location associated with a historical person. In a municipal building and planning application, a user could associate construction permit documents, construction plans, correspondence, and other images or documents with a map location indicating a residence or other building. Consequently, with the techniques herein a map becomes a sophisticated data analysis tool that may be richly associated with a diverse universe of documents, media files, or other data.

Gazetteer

Figure 5:
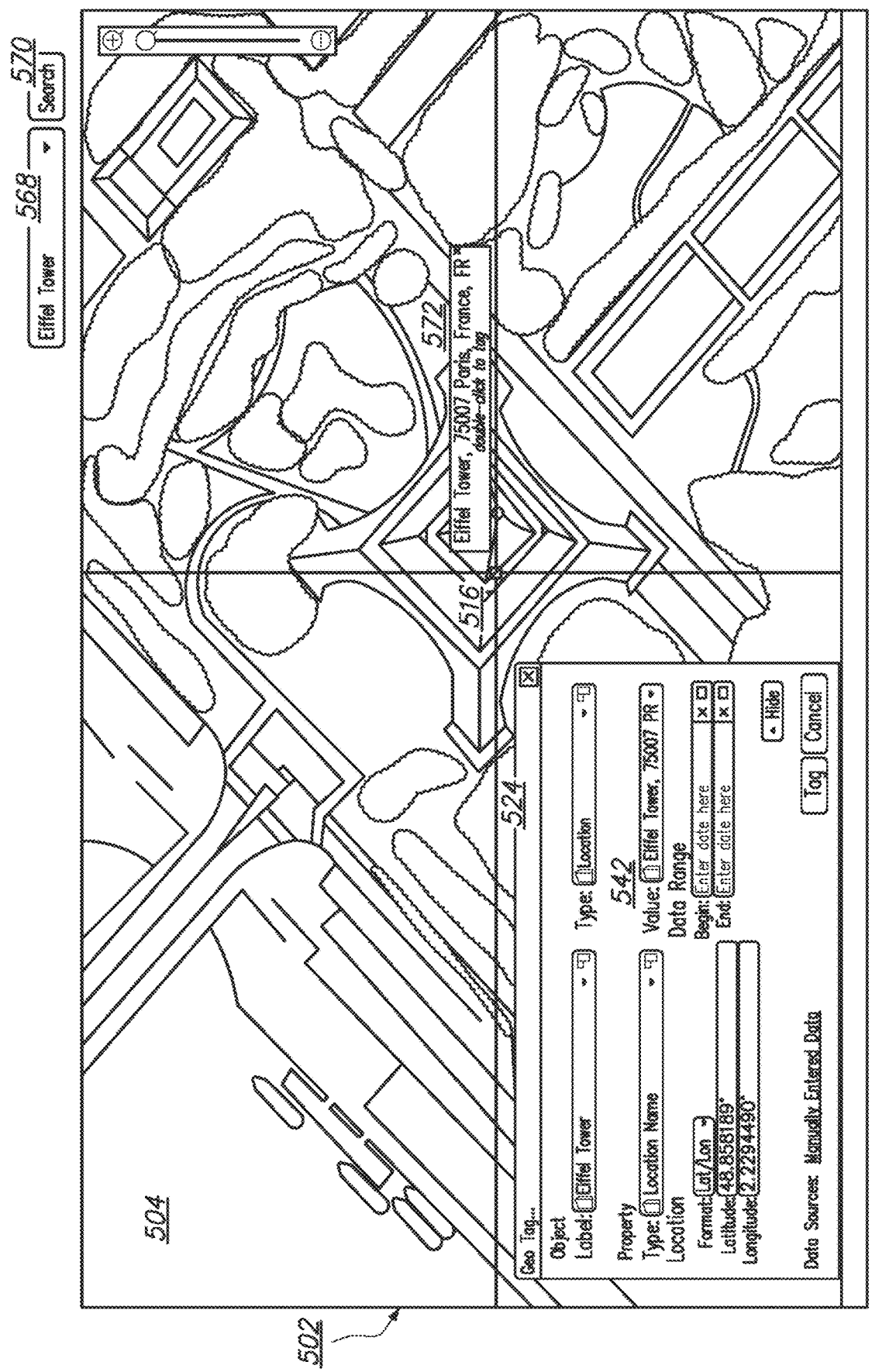
FIG. 5 is a screenshot of a graphical user interface for creating a geo tag for structured data using a gazetteer system.

FIG. 5 is a screenshot of a graphical user interface for creating a geo tag for structured data using a gazetteer system. A gazetteer system is a computer system that functions as a geographical index. In one embodiment, the gazetteer system receives as input a search or query string and returns a list of geographic coordinates that correspond to the inputted query string. The gazetteer system may maintain a database for associating text with geographical coordinates. The gazetteer system may provide an online network accessible interface that can be accessed by another computer system such as the mapping system of the present disclosure using known or standardized network protocols such as the HyperText Transfer Protocol (HTTP). Alternatively, the gazetteer system may be a component of the mapping system itself.

The interface of FIG. 5 comprises map image window 502, map image 504, geo tag dialog 524, search field 568, and search button 570. The interface may be displayed to a user on the display of a computer system such as display 124 of client 120.

A process for creating a geo tag for structured data using a gazetteer system proceeds generally as follows. Initially, the user enters one or more keywords into search field 568. The one or more keywords may be textual description of the geographic location the user desires to geo tag. For example, in the example embodiment depicted in FIG. 5, the user is interested in geo tagging the location of the "Eiffel Tower".

After entering one or more keywords in to search field 568 and upon selecting the search button 570, mapping system submits the search keyword(s) to a gazetteer system. The gazetteer system returns to the mapping system one or more geographic coordinates that correspond to the given search keyword(s). In one embodiment, upon receiving the geographic coordinate(s) from the gazetteer system, mapping system displays to the user a map image 504 showing all the geographic locations that match the given search keyword(s). In another embodiment, depending on the number of matches and the geographical distance between the matches, the mapping system displays a map image 504 showing only a subset of all the geographic locations that match the given search keyword(s). Each geographic coordinate returned from the gazetteer system that is displayed in the map image 504 is flagged with a location identifier flag 572.

To create a geo tag for structured data for the location identified by flag 572, the user may select a flag 572, for example, by double-clicking with a pointing device on the graphical area of flag 572. Selecting a flag 572 causes geo tag dialog 524 to appear. The user may then use dialog 524 to select an object property to associate with the location 516. In one embodiment, the default property value presented in property value control 542 is a string value returned from the gazetteer system in response to submitting the inputted search keywords to the gazetteer system.

Event Histogram

Figure 6:
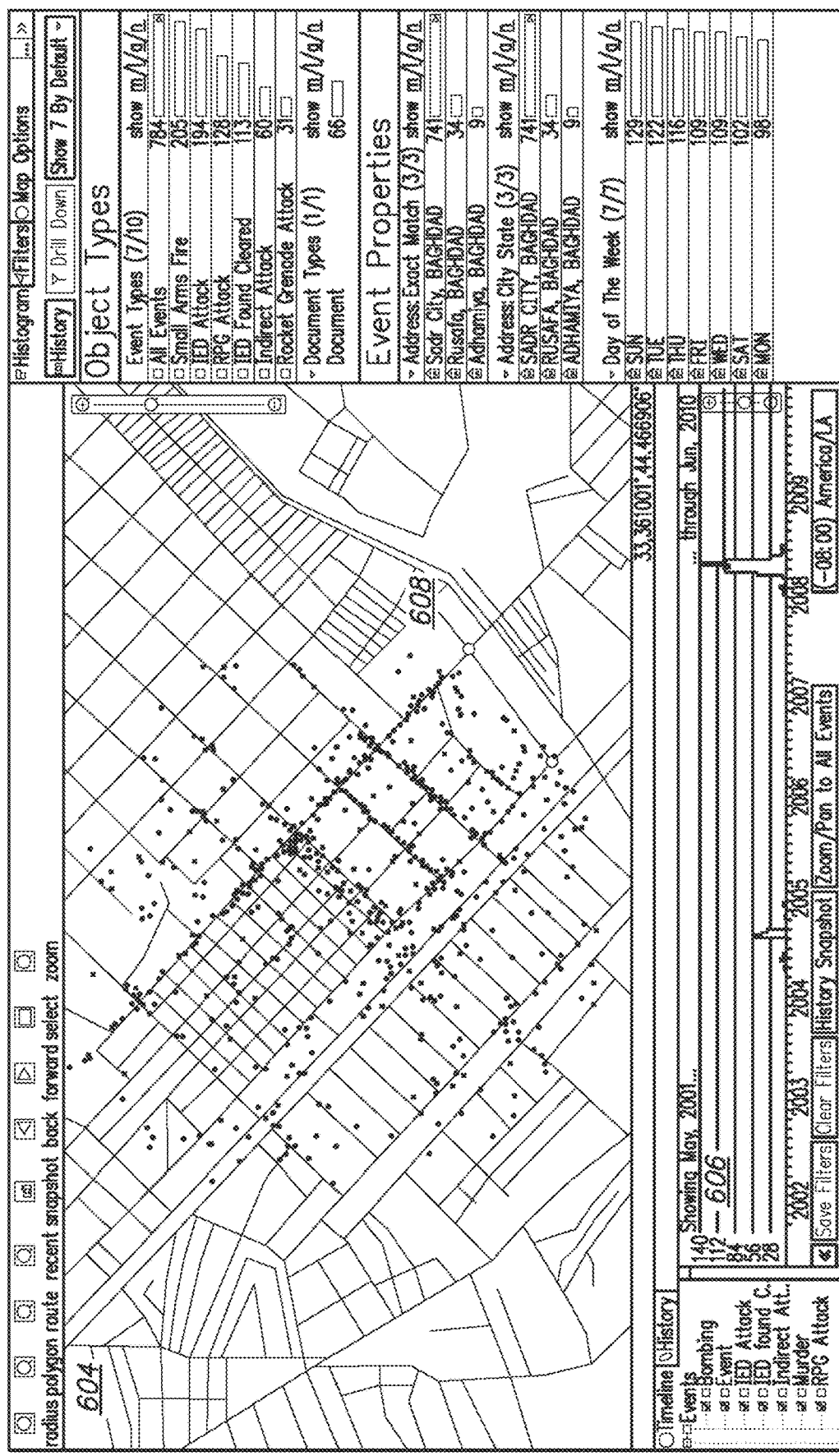
FIG. 6 is a screenshot of a graphical user interface for displaying structured geotagged data.

FIG. 6 is a screenshot of a graphical user interface 600 for displaying structured geotagged data. The interface may be displayed to a user on the display of a computer system such as display 124 of client 120. Interface 600 comprises map image window 602, map image 604, and histogram 606.

According to one embodiment, interface 600 allows a user to view the locations of geo tagged events that occurred during a period time. The location of each event is indicated on interface 600 as a superimposed dot 608 on map image 604. Interface 600 also provides a histogram 606 showing the distribution of the occurrence of the events shown on map image 604 over the period of time. Histogram 606 allows the user to quickly determine when the events shown on map image 604 occurred. For example, a user viewing the example interface 600 depicted in FIG. 6 could easily determine that most of the events plotted on map image 604 occurred in the spring of 2008 and the early fall of 2004.

Filtering Events

Figure 7:
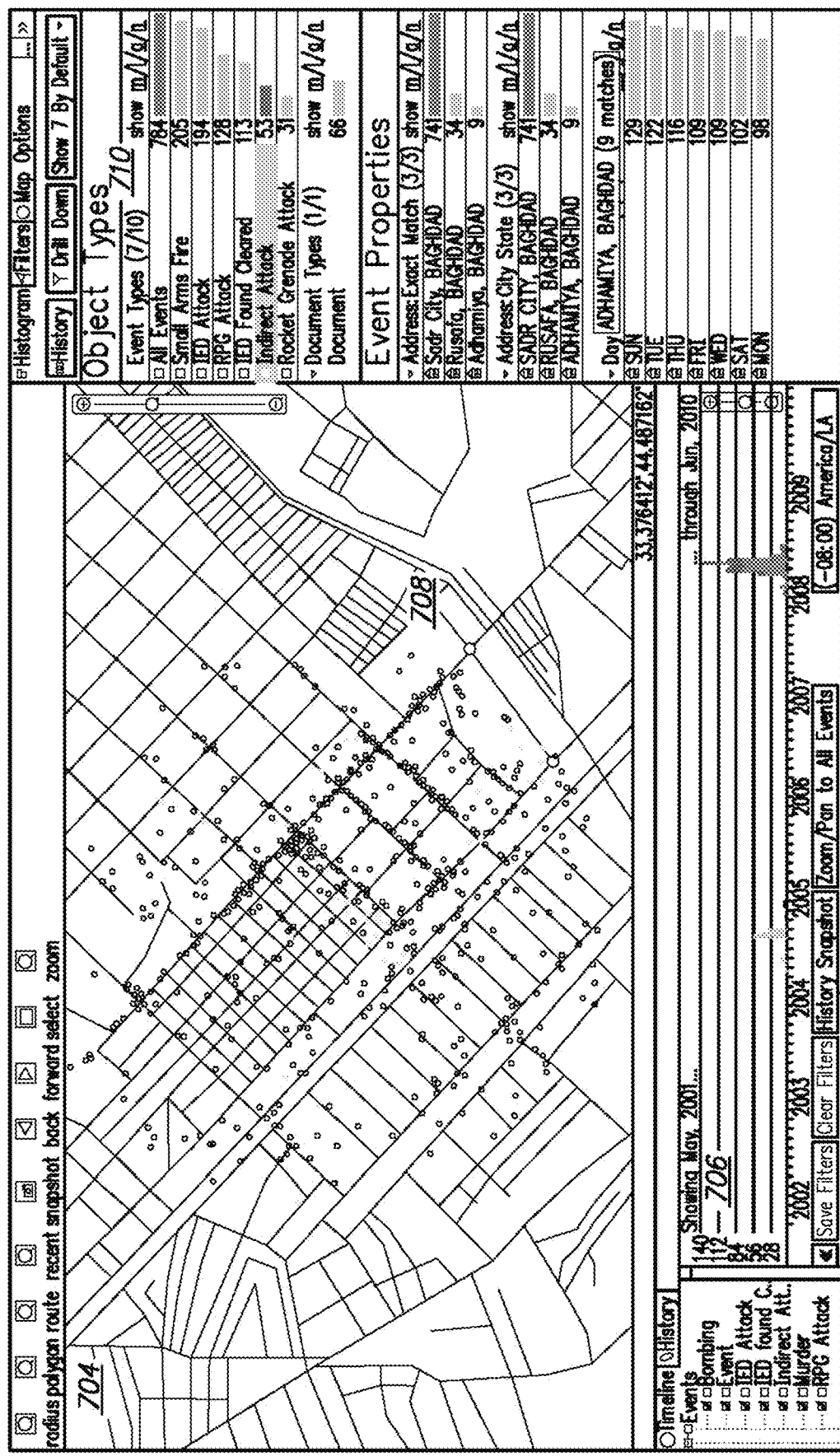
FIG. 7 is a color screenshot of a graphical user interface for displaying filtered structured geotagged data.

FIG. 7 is a screenshot of a graphical user interface 700 for displaying filtered structured geotagged data. The interface may be displayed to a user on the display of a computer system such as display 124 of client 120. Interface 700 comprises map image window 702, map image 704, histogram 706, and event type filtering panel 710.

According to one embodiment, interface 700 allows a user to filter geo tagged events displayed to the user based on the type of event. In one embodiment, the type of event may be selected from event type filtering panel 710. In the example embodiment depicted in FIG. 7, the "Indirect Attack" event type is selected in panel 710.

In one embodiment, selecting an event filtering type in panel 710 causes the mapping system to indicate on map image 704 the locations of the geo tagged events that correspond to the selected event type. For example, in the example embodiment depicted in FIG. 7, selecting the "Indirect Attack" event type on panel 710 causes the superimposed dots 708 on map image 704 that correspond to locations of "Indirect Attack" events to appear as yellow dots. All other events appear as white dots so that the locations of the selected event type can be visually distinguished from all other event types.

In another embodiment, instead of showing both the locations of selected event types and non-selected event types as superimposed dots 708 on map image 704, selecting an event type in panel 710 causes the mapping system to indicate on map image 704 only the locations of the geo tagged events that correspond to the selected event type. For example, instead of showing both the locations of the "Indirect Attack" event type (yellow dots) and the locations of all other event types (white dots), selecting the "Indirect Attack" event type in panel 710 causes the mapping system to superimpose a dot 708 on map image 704 only for the locations of "Indirect Attack" events.

Interface 700 also provides a histogram 706 showing the distribution of the occurrence of the events shown on map image 704 over a period of time. The bars of the histogram may be color coded to visually indicate the number of events of a particular type that occurred during a particular time. For example, in the example embodiment depicted by FIG. 7, the color of the bars on histogram 706 indicate that all "Indirect Attack" events occurred during 2004 while virtually all other events occurred in early 2008.

Event Time Windows

Figure 8:
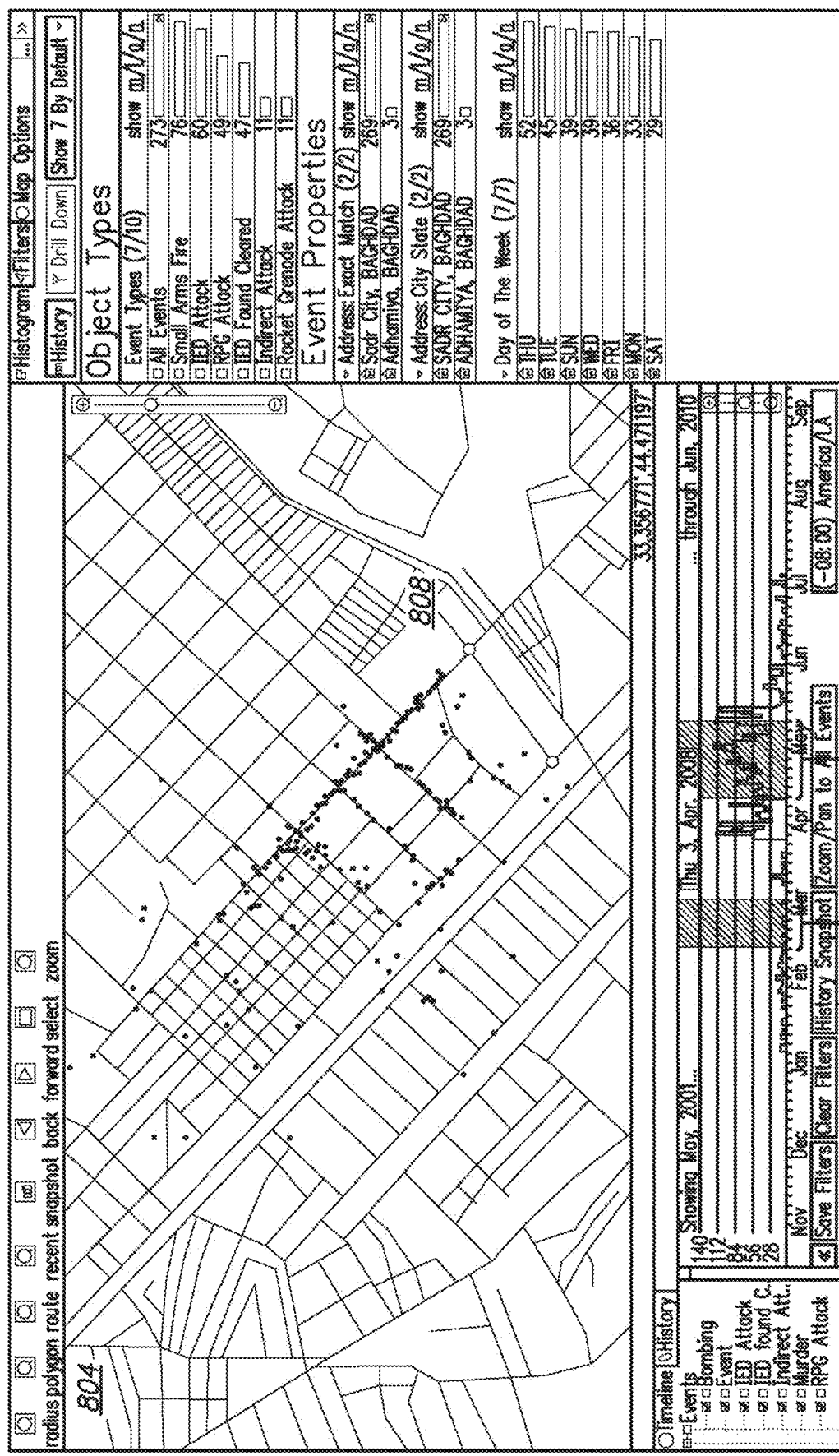
FIG. 8 is a screenshot of a graphical user interface for displaying filtered structured geotagged data.

FIG. 8 is a screenshot of a graphical user interface 800 for displaying filtered structured geotagged data. The interface may be displayed to a user on the display of a computer system such as display 124 of client 120. Interface 800 comprises map image window 802, map image 804, histogram 806.

According to one embodiment, the user can select one or more time windows on the histogram 806. By selecting one or more time windows the user can command the mapping system to show on map image 804 the locations of only those events that occurred during the selected time window (s). In one embodiment, to select a time window, the user uses a pointing device to select a first time boundary on the histogram timeline, drags the pointing device to a second point on the histogram timeline, and then releases the pointing device to select a second time boundary. The area between the selected first time boundary and the second time boundary represents the selected time window. In one embodiment, the time window is shaded to give a visual indication with respect to a histogram timeline of the start date, end date, and duration of the time window.

In one embodiment, a user can make multiple discontinuous time window selections. To do so the user may depress a designated keyboard key while making second and any subsequent time window selections so as to preserve the existing time window selections. In one embodiment, the designated keyboard key is the "Alt" key or the "Ctrl".

In one embodiment, as time windows are selected by the user on the histogram 806, the mapping system updates the display of map image 804. In particular, the mapping system updates the display of map image 804 to show the locations of only those events that fall within the selected time window. For example, in the example embodiment depicted in FIG. 8, only the locations of the events that fall within time windows 812A and 812B are designated with superimposed dots 808 on map image 804.

Geo-Temporal Views of Events

Figure 9A:
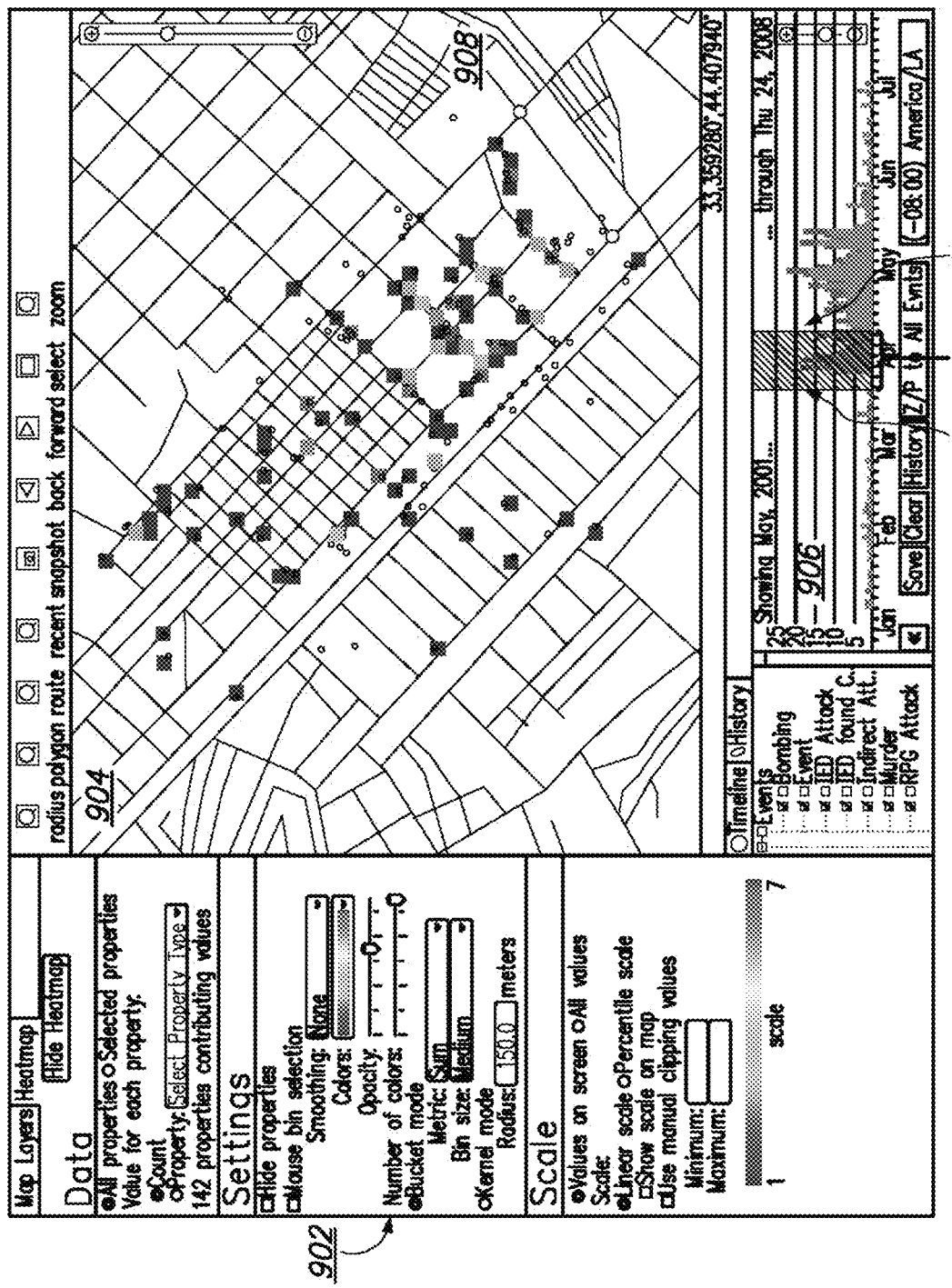
FIG. 9A and FIG. 9B are color screenshots of a graphical user interface for displaying filtered structured geotagged data.
Figure 9B:
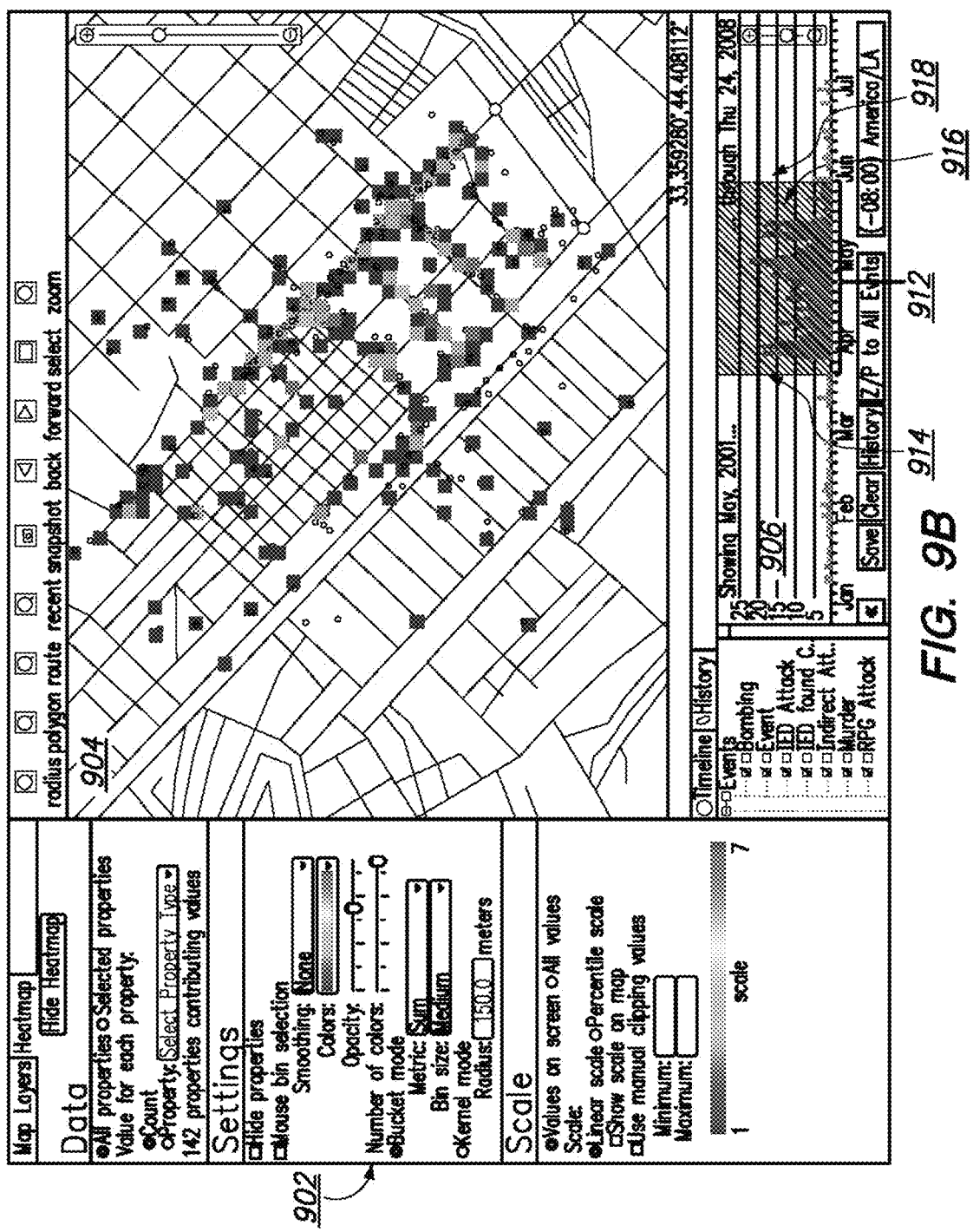

FIGS. 9A and 9B are screenshots of a graphical user interface 900 for displaying filtered structured geotagged data. The interface may be displayed to a user on the display of a computer system such as display 124 of client 120. Interface 900 comprises map image window 902, map image 904, and histogram 906.

According to one embodiment, the user can select an initial time window on the histogram 906 and then drag a boundary of the initial time window using a pointing device to expand or contract the time window. As the user expands or contracts the time window by dragging a boundary of the time window, the mapping system continuously updates the map image 904 to show the locations of the events that fall within the time window as the time window is expanded and contracted. In this way, the user can create a geo-temporal view of events that give the user a sense of the progression of the location of events over a period of time.

In the example embodiment depicted in FIG. 9A, initial time window 912 has a start time boundary 914 and an end time boundary 916. The duration of the time window 912 is visually indicated as a grayed rectangular portion of histogram 906 between boundary 914 and boundary 916. As shown in FIG. 9A, the locations of events that fall within time window 912 are shown on map image 904 as a heat map. The colors of the heat map indicate the relative density of events that occurred at a particular location during time window 912. Cooler colors (e.g., blue) indicate a relatively few number of events at a particular location and hotter colors (e.g., red) indicate a relatively larger number of events at a particular location.

FIG. 9B shows time window 912 after the user has dragged the rightmost boundary of the time window 912 from boundary position 916 to boundary position 918. Map image 904 is updated to indicate the locations of the events that occurred within time window 912 as defined by the new boundaries 914 and 918. Further, according to an embodiment, as the user drags the rightmost boundary of time window 912 from boundary 916 to boundary 918 the mapping system continuously updates map image 904 to indicate the locations of the events that occurred within the time window.

In another embodiment, instead of creating a geo-temporal view of events based on an expanding or contracting time window, the user can create a geo-temporal view of events based on a sliding time window in which as the user drags time window such that both the left most boundary and the right most boundary slide along with the window. As the user drags the sliding time window, the mapping system continuously updates map image 904 to indicate the location of events that occurred within the boundaries of the sliding time window.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Extensions and Alternatives

In the foregoing specification, embodiments of the invention have been described with reference to numerous specific details that may vary from implementation to implementation. For example, certain embodiments have been described with respect to geo tagging locations on the Earth, but other embodiments may be applied to geo tagging other kinds of locations or other planetary bodies. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
causing display of a digital map;
receiving a selection of a geographic location;
causing display of controls of a computer graphical user interface for selecting a data object;
receiving a selection of a particular data object;
receiving a text string entered through the controls;
querying a database for data object properties that satisfy the received text string;
causing display of a result of the querying including one or more selectable items;
receiving, through said controls, a selection of a first instance of the particular data object stored in the database, the first instance of the particular data object comprising one or more first data object properties, including an item of the one or more selectable items having a first value;
receiving, through said controls, a selection of a second instance of the particular data object stored in the database, the second instance of the particular data object comprising one or more second data object properties, including the item having a second value, that have different values than the one or more first data object properties; and
in response to receiving the selection of the first instance of the particular data object and the selection of the second instance of the particular data object, storing, in the database, an association between the geographic location, the item of the first instance of the particular data object comprising the one or more first data object properties, and the item of the second instance of the particular data object comprising the one or more second data object properties that are different than the one or more first data object properties.

2. The method of claim 1, wherein the selection of the geographic location is a selection of a point on the digital map.

3. The method of claim 1, further comprising: receiving a second text string entered through the controls;
querying the database for data objects that satisfy the received second text string; causing display of a search results panel presenting one or more selectable items corresponding to one or more data objects that are stored in the database and that satisfy the second text string;
wherein receiving, through said controls, the selection of the first instance of the particular data object comprises receiving, through the search results panel, a selection of one of the one or more selectable items, wherein the selectable item, selected through the search results panel, corresponds to the particular data object.

4. The method of claim 1, further comprising: receiving a second text string entered through the controls;
querying the database for data objects that satisfy the second text string;
causing display of a search results panel that provides second controls for creating a new data object in the database using the second text string; and
in response to input received through the second controls, creating the particular data object.

5. The method of claim 1, wherein the computer graphical user interface comprises additional controls for selecting a type of the particular data object selected through the controls.

6. The method of claim 1, wherein the computer graphical user interface includes second controls for selecting a property of the particular data object selected through the controls.

7. The method of claim 6, wherein the second controls for creating a new property of the particular data object selected through the controls comprises third controls for entering a type of the new property and fourth controls for entering a value of the new property.

8. The method of claim 1, wherein the computer graphical user interface includes second controls for creating a new property of the particular data object selected through the controls.

9. The method of claim 1, wherein the computer graphical user interface displays the geographic location according to a coordinate system.

10. The method of claim 9, wherein the computer graphical user interface comprises second controls for selecting a coordinate system of a plurality of coordinate systems for displaying the geographic location.

11. The method of claim 1, wherein the computer graphical user interface comprises second controls for editing the geographic location.

12. The method of claim 1, wherein the computer graphical user interface comprises second controls for specifying a date range within which the geographic location is applicable to a property, selected through the controls, of an instance of the particular data object selected through the controls.

13. A system comprising:
one or more processors;
one or more storage media storing instructions which, when executed by the one or more processors, cause:
causing display of a digital map;
receiving a selection of a geographic location;
causing display of controls of a computer graphical user interface for selecting a data object;
receiving a selection of a particular data object;
receiving a text string entered through the controls;
querying a database for data object properties that satisfy the received text string;
causing display of a result of the querying including one or more selectable items corresponding to one or more properties of the particular data object;
receiving, through said controls, a selection of a first instance of the particular data object stored in the database, the first instance of the particular data object comprising one or more first data object properties, including an item of the one or more selectable items having a first value;
receiving, through said controls, a selection of a second instance of the particular data object stored in the database, the second instance of the particular data object comprising one or more second data object properties, including the item having a second value, that have different values than the one or more first data object properties; and in response to receiving the selection of the first instance of the particular data object and the selection of the second instance of the particular data object, storing, in the database, an association between the geographic location, the item of the first instance of the particular data object comprising the one or more first data object properties, and the item of the second instance of the particular data object comprising the one or more second data object properties that are different than the one or more first data object properties.

14. The system of claim 13, wherein the selection of the geographic location is a selection of a point on the digital map.

15. The system of claim 13, wherein the instructions, when executed by the one or more processors, further cause:

receiving a second text string entered through the controls;

querying the database for data objects that satisfy the received second text string; causing display of a search results panel presenting one or more selectable items corresponding to one or more data objects that are stored in the database and that satisfy the second text string;

wherein receiving, through said controls, the selection of the first instance of the particular data object comprises receiving, through the search results panel, a selection of one of the one or more selectable items, wherein the selectable item, selected through the search results panel, corresponds to the particular data object.

16. The system of claim 13, wherein the instructions, when executed by the one or more processors, further cause:

receiving a second text string entered through the controls;

querying the database for data objects that satisfy the second text string;

causing display of a search results panel that provides second controls for creating a new data object in the database using the second text string; and in response to input received through the second controls, creating the particular data object.

17. The system of claim 13, wherein the computer graphical user interface comprises additional controls for selecting a type of the particular data object selected through the controls.

18. The system of claim 13, wherein the computer graphical user interface includes second controls for selecting a property of the particular data object selected through the controls.

19. The system of claim 13, wherein the computer graphical user interface includes second controls for creating a new property of the particular data object selected through the controls.

20. One or more computer-readable non-transitory storage media storing instructions which, when executed by one or more processors, cause:

causing display of a digital map;

receiving a selection of a geographic location;

causing display of controls of a computer graphical user interface for selecting a data object;

receiving a selection of a particular data object;

receiving a text string entered through the controls;

querying a database for data object properties that satisfy the received text string;

causing display of a result of the querying including one or more selectable items;

receiving, through said controls, a selection of a first instance of the particular data object stored in the database, the first instance of the particular data object comprising one or more first data object properties, including an item of the one or more selectable items having a first value;

receiving, through said controls, a selection of a second instance of the particular data object stored in the database, the second instance of the particular data object comprising one or more second data object properties, including the item having a second value, that have different values than the one or more first data object properties; and in response to receiving the selection of the first instance of the particular data object and the selection of the second instance of the particular data object, storing, in the database, an association between the geographic location, the item of the first instance of the particular data object comprising the one or more first data object properties, and the item of the second instance of the particular data object comprising the one or more second data object properties that are different than the one or more first data object properties.

* * * * *